(12) United States Patent
Sato

(10) Patent No.: US 12,502,718 B2
(45) Date of Patent: Dec. 23, 2025

(54) OPENING/CLOSING CHUCK AND METHOD OF MANUFACTURING FINGERS

(71) Applicant: SMC CORPORATION, Tokyo (JP)

(72) Inventor: Motohiro Sato, Toride (JP)

(73) Assignee: SMC CORPORATION, Tokyo (JP)

( * ) Notice: Subject to any disclaimer, the term of this patent is extended or adjusted under 35 U.S.C. 154(b) by 0 days.

(21) Appl. No.: 18/636,344

(22) Filed: Apr. 16, 2024

(65) Prior Publication Data

US 2024/0261874 A1    Aug. 8, 2024

Related U.S. Application Data

(62) Division of application No. 17/588,407, filed on Jan. 31, 2022, now abandoned.

(30) Foreign Application Priority Data

Feb. 18, 2021 (JP) .................. 2021-023916

(51) Int. Cl.
*B23B 31/177* (2006.01)
*B24B 9/00* (2006.01)

(52) U.S. Cl.
CPC .......... *B23B 31/16237* (2013.01); *B24B 9/00* (2013.01); *B23B 2231/24* (2013.01); *B23B 2231/32* (2013.01)

(58) Field of Classification Search
CPC ........ B23B 31/16237; B23B 31/16254; B23B 2231/32; B25J 15/028; Y10T 279/1973
See application file for complete search history.

(56) References Cited

U.S. PATENT DOCUMENTS

| 3,199,880 A | | 8/1965 | Blattry | |
|---|---|---|---|---|
| 3,424,467 A | | 1/1969 | Buck | |
| 3,658,353 A | * | 4/1972 | Parsons | B23B 31/16237 279/74 |
| 4,123,075 A | | 10/1978 | Rosewarne | |
| 4,982,970 A | | 1/1991 | Otani | |
| 4,993,896 A | * | 2/1991 | Dombrowski | B23C 3/12 409/138 |
| 5,197,748 A | | 3/1993 | Wu | |

(Continued)

FOREIGN PATENT DOCUMENTS

| DE | 2113328 A1 | 9/1972 |
|---|---|---|
| DE | 202005009480 U1 | 10/2005 |

(Continued)

OTHER PUBLICATIONS

Japanese Office Action issued Aug. 13, 2024 in Japanese Patent Application No. 2021-023916 with English machine translation, 6 pages.

(Continued)

*Primary Examiner* — Eric A. Gates
(74) *Attorney, Agent, or Firm* — Oblon, McClelland, Maier & Neustadt, L.L.P.

(57) ABSTRACT

A finger includes a pair of overhanging portions that project out laterally from a main body portion. Outer peripheral surfaces of the overhanging portions are made up from five surfaces including upper surfaces, side surfaces, lower surfaces, first end surfaces, and second end surfaces. Crowning is applied to the intersections between these surfaces.

2 Claims, 15 Drawing Sheets

(56) References Cited

U.S. PATENT DOCUMENTS

| | | | |
|---|---|---|---|
| 5,292,139 A * | 3/1994 | Gaillard | B23B 31/162 |
| | | | 279/123 |
| 6,799,767 B2 | 10/2004 | Kuroda | |
| 6,830,273 B2 | 12/2004 | Michler | |
| 6,997,656 B2 * | 2/2006 | Bengston | B23Q 3/183 |
| | | | 157/17 |
| 7,883,132 B2 | 2/2011 | Maffeis | |
| 7,976,087 B2 | 7/2011 | Maffeis | |
| 11,141,798 B2 * | 10/2021 | Nishimiya | B23B 31/16275 |
| 11,446,790 B2 * | 9/2022 | Franz | B25B 5/02 |
| 2003/0030294 A1 | 2/2003 | Michler et al. | |
| 2009/0127879 A1 * | 5/2009 | Maffeis | B25J 15/028 |
| | | | 294/207 |
| 2018/0290267 A1 | 10/2018 | Kirsten | |
| 2022/0379387 A1 | 12/2022 | Kesterke, III | |

FOREIGN PATENT DOCUMENTS

| | | | | |
|---|---|---|---|---|
| EP | 3 563 989 A1 | 11/2019 | | |
| GB | 2283189 A | 5/1995 | | |
| JP | 5-26231 A | 2/1993 | | |
| JP | 2003-526528 A | 9/2003 | | |
| JP | 2009-119596 A | 6/2009 | | |
| KR | 20040086082 A * | 10/2004 | | H10D 62/117 |
| WO | WO 2020/085359 A1 | 4/2020 | | |

OTHER PUBLICATIONS

Japanese Notice of Reasons for Refusal issued May 21, 2024 in Japanese Application No. 2021-023916 with English translation, 8 pgs.

* cited by examiner

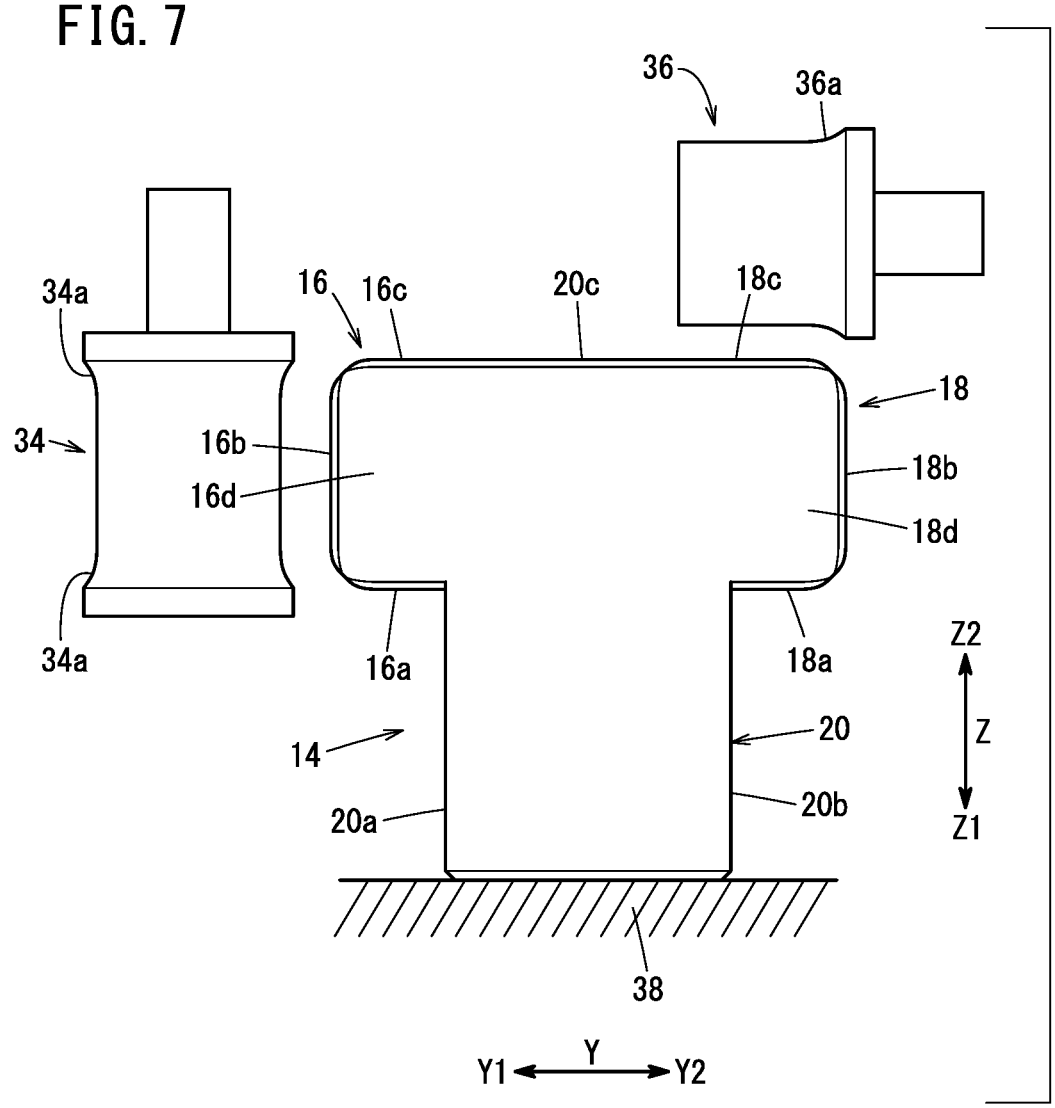

OPENING/CLOSING CHUCK AND METHOD OF MANUFACTURING FINGERS

CROSS-REFERENCE TO RELATED APPLICATIONS

This application is a divisional of and claims benefit under 35 U.S.C. § 120 to U.S. application Ser. No. 17/588,407, filed Jan. 31, 2022, which is based upon and claims the benefit of priority under 35 U.S.C. § 119 from Japanese Patent Application No. 2021-023916 filed on Feb. 18, 2021, the entire contents of each of which are incorporated herein by reference.

BACKGROUND OF THE INVENTION

Field of the Invention

The present invention relates to an opening/closing chuck equipped with a pair of fingers for gripping a workpiece, as well as a method for manufacturing the fingers.

Description of the Related Art

Conventionally, an opening/closing chuck has been known in which a pair of fingers for gripping a workpiece are slidably supported in directions to approach and separate away from each other. For example, in JP 2003-526528 A, a parallel gripper is disclosed which adjusts a wedge-shaped hook transmission portion by a piston. The wedge-shaped hook transmission portion brings two base jaws, which are movably guided in a housing, into closer proximity or farther away from each other.

Further, in EP 3563989 A1, in a grip device equipped with a pair of slides, it is disclosed that ramps are provided on guide flanks of the respective slides. In accordance therewith, a wedge gap is formed that widens toward end surfaces of the slides.

SUMMARY OF THE INVENTION

When a workpiece is gripped using a pair of slidably supported fingers, due to a reaction force from the workpiece, a load in a predetermined direction (a vertical direction or a lateral direction) acts on the fingers. Further, moments act which attempt to rotate the fingers about various three-dimensional axes. The loads and the moments that act on the fingers increase as the gripping force on the workpiece increases. Further, the moments that act on the fingers increase as the distance between workpiece gripping positions on gripping members (attachments), which are provided to extend from the fingers, and the supported positions of the fingers become longer. When such loads or moments acting on the fingers are large, concentration of stress occurs on contact surfaces between the fingers and the body, excessive surface pressure is generated, and the fingers and the sliding surfaces of the body are damaged.

However, a technique that takes into consideration concentration of stress generated in the fingers and the body has not yet been sufficiently developed. The technique disclosed in EP 3563989 A1 is somewhat effective in relieving concentration of stress and preventing excessive surface pressure when opposing ends of a pair of slides attempt to rotate so as to open at an angle. However, the disclosed technique does not take into consideration that various three-dimensional axial moments act on the slides.

The present invention has the object of solving the aforementioned problem.

An opening/closing chuck according to the present invention comprises a pair of fingers configured to slide inside of a guide groove of a body, and which are slidably supported in directions to approach toward and separate away from each other. The fingers each include a pair of overhanging portions configured to project out laterally from a main body portion, and outer peripheral surfaces of the overhanging portions are made up from five surfaces including upper surfaces, side surfaces, lower surfaces, first end surfaces, and second end surfaces. Crowning is applied to intersections between these surfaces.

According to the above-described opening/closing chuck, concentration of stress generated in the fingers due to loads acting on the fingers in a vertical direction and moments about three axes can be alleviated, and a maximum surface pressure can be lowered.

Further, in a first method of manufacturing according to the present invention, the fingers slide inside a guide groove of a body of an opening/closing chuck, are slidably supported in directions to approach toward and separate away from each other, and include a pair of overhanging portions configured to project out laterally from a main body portion. Outer peripheral surfaces of the overhanging portions are made up from five surfaces including upper surfaces, side surfaces, lower surfaces, first end surfaces, and second end surfaces, wherein the upper and lower surfaces are perpendicular to the side surfaces. The first method of manufacturing comprises a step of applying crowning at intersections of the five surfaces, by a combination of performing grinding with respect to the side surfaces by a first machining tool, and performing grinding with respect to the upper surfaces and the lower surfaces by a second machining tool.

Further, in a second method of manufacturing according to the present invention, the fingers slide inside a guide groove of a body of an opening/closing chuck, are slidably supported in directions to approach toward and separate away from each other, and include a pair of overhanging portions configured to project out laterally from a main body portion. Outer peripheral surfaces of the overhanging portions are made up from five surfaces including upper surfaces, side surfaces, lower surfaces, first end surfaces, and second end surfaces, and the upper surfaces and the lower surfaces are tapered surfaces configured to come into closer proximity to each other toward the side surfaces. The second method of manufacturing comprises a step of applying crowning at intersections of the five surfaces, by performing grinding with respect to the side surfaces, and simultaneously performing grinding with respect to the upper surfaces and the lower surfaces using a single machining tool.

According to the first method of manufacturing and the second method of manufacturing described above, the crowning process for alleviating the concentration of stress generated in the fingers and the body can be easily performed in a fewer number of steps. The above-described concentration of stress is caused by loads acting on the fingers in the vertical direction and moments about the three axes.

In the opening/closing chuck according to the present invention, crowning is applied to the intersections of the five surfaces including the upper surfaces, the side surfaces, the lower surfaces, the first end surfaces, and the second end surfaces that make up the outer peripheral surfaces of the overhanging portions of the fingers. Therefore, it is possible to alleviate concentration of stress when moments about the three axes or loads in a vertical direction act on the fingers.

Further, in the first method of manufacturing the fingers according to the present invention, grinding with respect to the side surfaces of the overhanging portions by the first machining tool, and grinding with respect to the upper surfaces and the lower surfaces of the overhanging portions by the second machining tool are combined. Consequently, since crowning is applied to the intersections of the five surfaces of the overhanging portions, the crowning process can be easily performed in a fewer number of steps.

Further, in the second method of manufacturing the fingers according to the present invention, using a single machining tool, grinding is performed with respect to the side surfaces of the overhanging portions and simultaneously grinding is performed with respect to the upper surfaces and the lower surfaces of the overhanging portions. Consequently, since crowning is applied to the intersections of the five surfaces of the overhanging portions, the crowning process can be easily performed in an even fewer number of steps.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 7 is a diagram schematically showing a method of applying crowning to the finger shown in FIG. 4;

DESCRIPTION OF THE INVENTION

Figure 1:
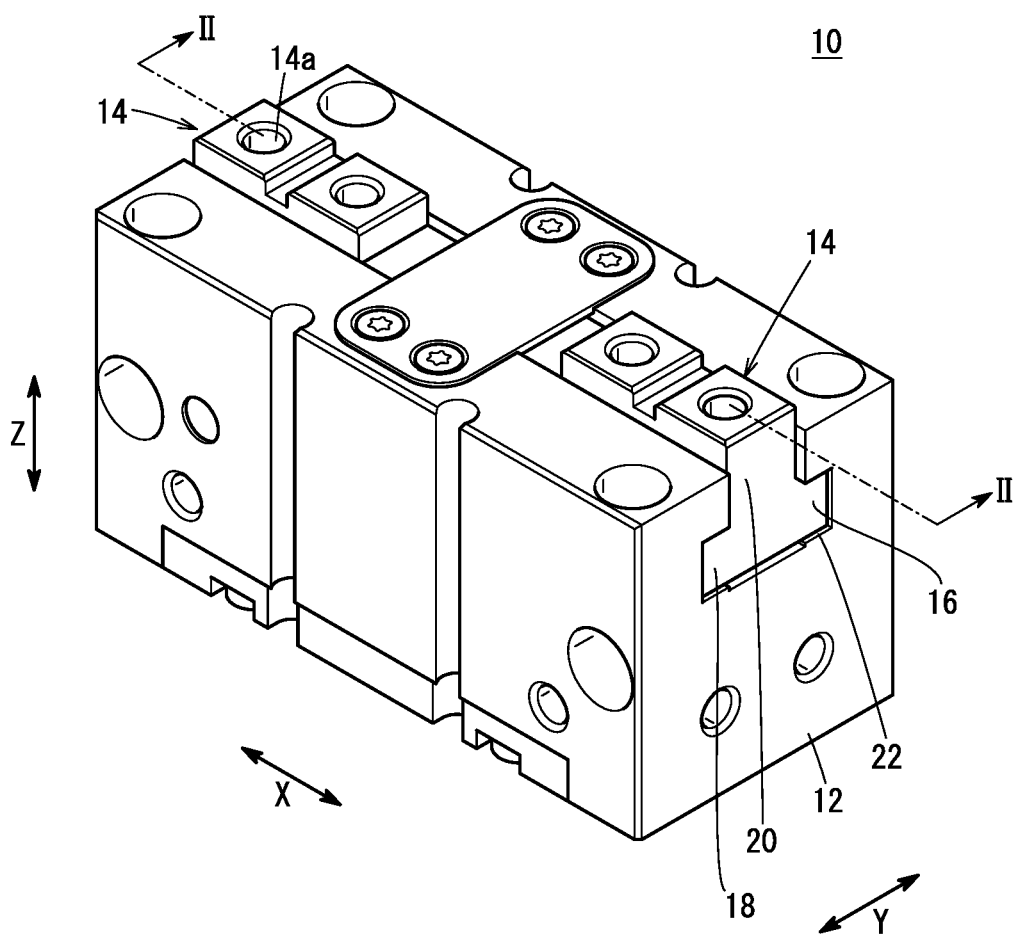
FIG. 1 shows an external perspective view of an opening/closing chuck according to a first embodiment of the present invention.

In the description given below, when terms related to the up, down, left, and right directions are used, the terms refer to the directions shown in the drawings for the sake of convenience, and such terms are not intended to limit the actual arrangement or the like of the respective constituent members.

First Embodiment

Figure 2:
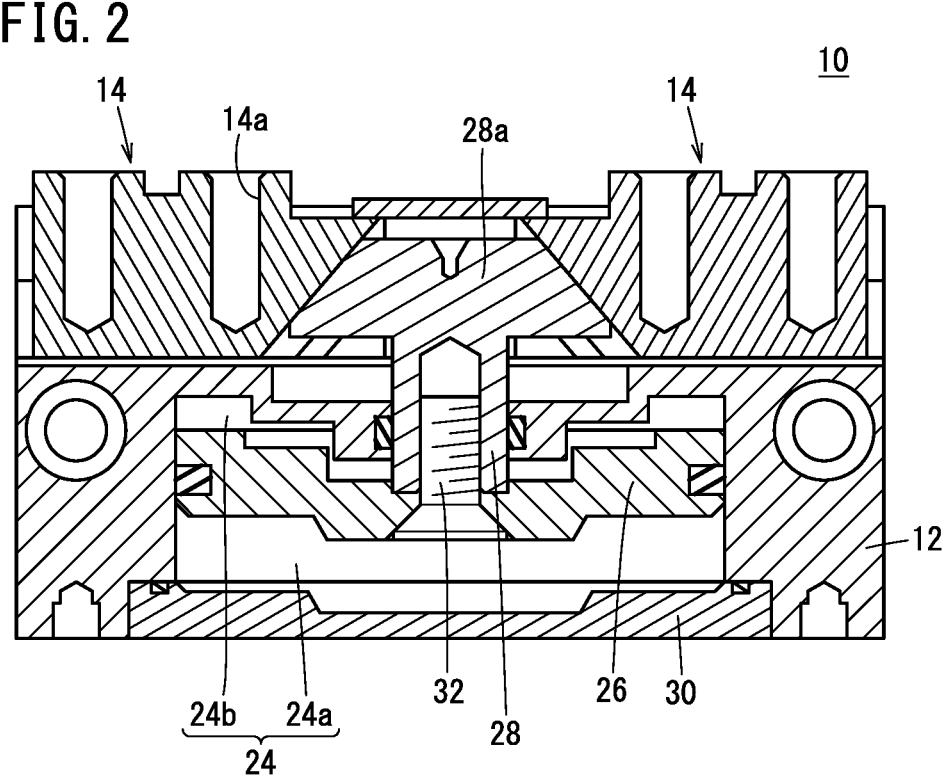
FIG. 2 is a cross-sectional view taken along line II-II of the opening/closing chuck shown in FIG. 1.

A description will be given with reference to FIGS. 1 to 6 concerning an opening/closing chuck 10 according to the first embodiment of the present invention. As shown in FIGS. 1 and 2, the opening/closing chuck 10 includes a rectangular parallelepiped shaped body 12, and a pair of fingers 14 that are slidably supported in a longitudinal direction (the X direction) of the body 12. The opening/closing chuck 10 is used by connecting non-illustrated attachments for gripping a workpiece to the fingers 14. That which is shown by reference numeral 14a are screw holes used for connecting the attachments.

The body 12 includes a cylinder chamber 24 at a lower central part in the longitudinal direction. Further, the body 12 has a guide groove 22 that extends in the longitudinal direction of the body 12, and both ends of which open on end surfaces of the body 12 at portions above the cylinder chamber 24. A piston 26 which is capable of sliding in a vertical direction (Z direction) is disposed in the cylinder chamber 24. The cylinder chamber 24 is partitioned into a first pressure chamber 24a formed on a lower side of the piston 26, and a second pressure chamber 24b formed on an upper side of the piston 26. The first pressure chamber 24a is closed by a cap 30.

A piston rod 28 which is connected by a bolt 32 to the piston 26 extends further upward through the second pressure chamber 24b. An upper part of the piston rod 28 faces toward the guide groove 22 and constitutes a cam portion 28a of a known structure for driving the fingers 14. When air is supplied to the first pressure chamber 24a and the air in the second pressure chamber 24b is discharged, the piston 26 and the piston rod 28 are moved upward. Consequently, the pair of fingers 14 slide in directions away from each other. When air is supplied to the second pressure chamber 24b and the air in the first pressure chamber 24a is discharged, the piston 26 and the piston rod 28 are moved downward. Consequently, the pair of fingers 14 slide in directions to approach one another.

Figure 3:
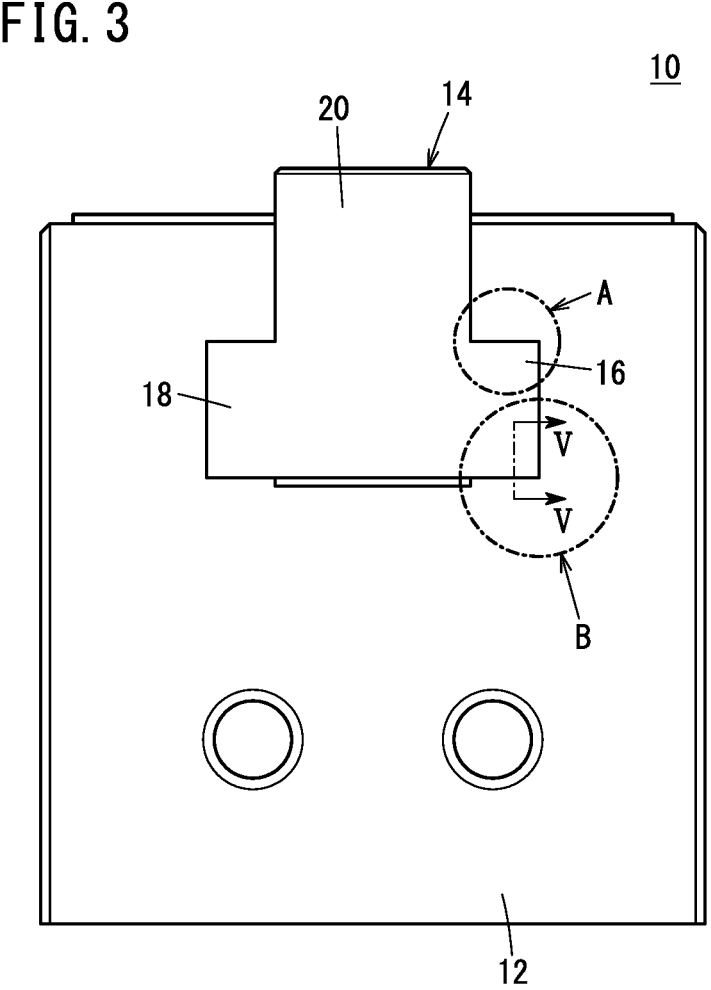
FIG. 3 is a front view of the opening/closing chuck shown in FIG. 1.
Figure 4:
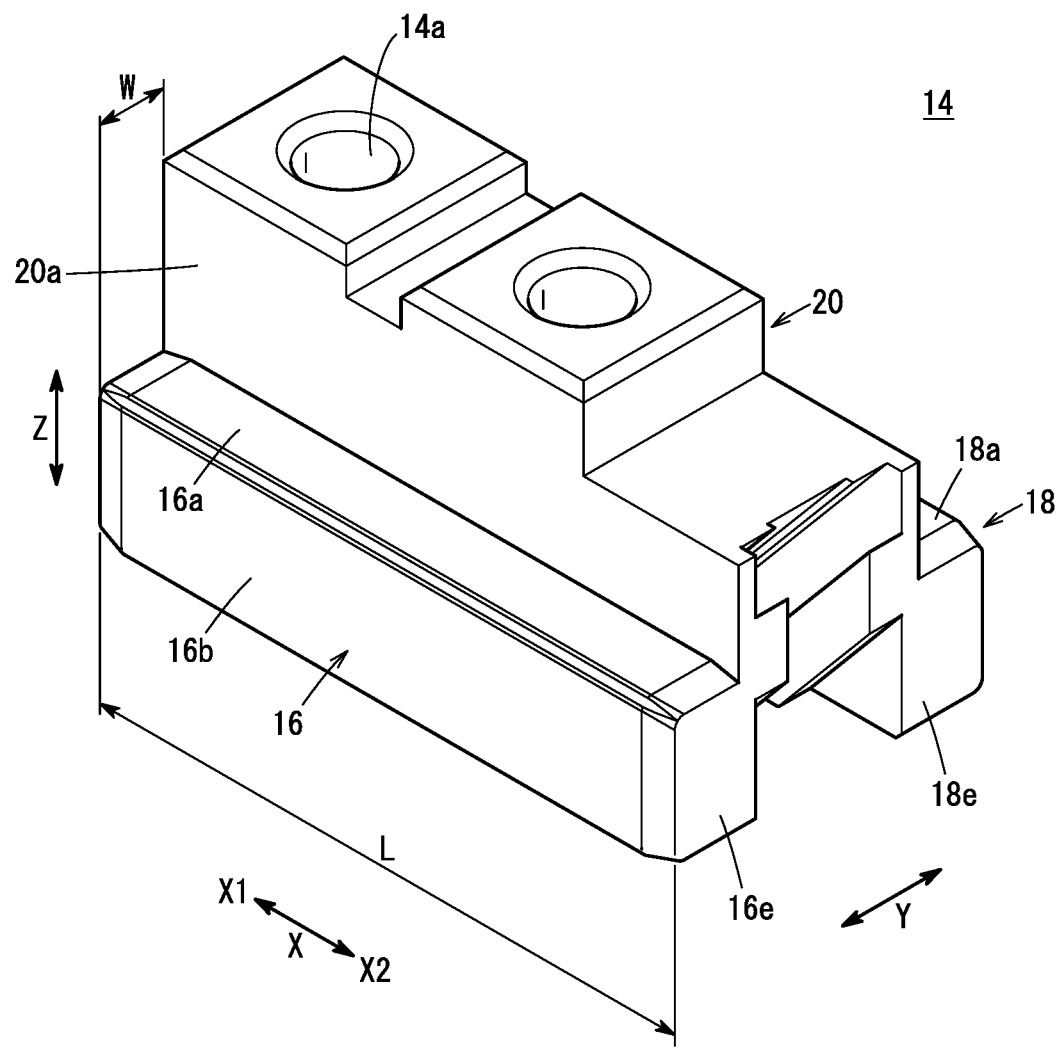
FIG. 4 is an external perspective view of a finger of the opening/closing chuck shown in FIG. 1.

As shown in FIG. 3 and FIG. 4, each of the fingers 14 has an inverted T-shaped cross section. Each of the fingers 14 includes a pair of overhanging portions 16 and 18 that project out laterally from the main body portion 20 over the entire length in the longitudinal direction (the X direction) of the fingers 14. The guide groove 22 of the body 12 has an inverted T-shaped cross section that conforms to the cross-sectional shape of the fingers 14. The fingers 14 slide while undergoing sliding movement inside the guide groove 22 of the body 12.

In order to enable the sliding movement of the fingers 14, upper surfaces 16a and 18a, side surfaces 16b and 18b, and lower surfaces 16c and 18c of the overhanging portions 16 and 18 face toward the wall surface of the guide groove 22 with a minute gap therebetween. A gap which is larger than the aforementioned minute gap exists between the side surfaces 20a and 20b of the main body portion 20 and the wall surfaces of the guide groove 22.

The bottom surface 20c of the main body portion 20 lies substantially flush with the lower surfaces 16c and 18c of the overhanging portions 16 and 18. Stepped portions 22a exists between the wall surface of the guide groove 22 facing toward the bottom surface 20c of the main body portion 20, and the wall surfaces of the guide groove 22 facing toward the lower surfaces 16c and 18c of the overhanging portions 16 and 18 (see FIG. 6B).

Outer peripheral surfaces of the respective overhanging portions 16 and 18 of the fingers 14 are made up from five surfaces including the upper surfaces 16a and 18a, the side surfaces 16b and 18b, the lower surfaces 16c and 18c, first end surfaces (end surfaces in the direction X1) 16d and 18d, and second end surfaces (end surfaces in the direction X2) 16e and 18e. The upper surfaces 16a and 18a and the lower surfaces 16c and 18c of the respective overhanging portions 16 and 18 are perpendicular to the side surfaces 20a and 20b of the main body portion 20, and are perpendicular to the side surfaces 16b and 18b of the overhanging portions 16 and 18.

Crowning is applied to the intersections between the above-described five surfaces. More specifically, crowning is applied to the intersections between the upper surfaces 16a and 18a and the first end surfaces 16d and 18d, to the intersections between the side surfaces 16b and 18b and the first end surfaces 16d and 18d, and to the intersections between the lower surfaces 16c and 18c and the first end surfaces 16d and 18d. Similarly, crowning is applied to the intersections between the upper surfaces 16a and 18a and the second end surfaces 16e and 18e, to the intersections between the side surfaces 16b and 18b and the second end surfaces 16e and 18e, and to the intersections between the lower surfaces 16c and 18c and the second end surfaces 16e and 18e. Further, crowning is also applied to the intersections between the upper surfaces 16a and 18a and the side surfaces 16b and 18b, and to the intersections between the lower surfaces 16c and 18c and the side surfaces 16b and 18b.

Figure 5:
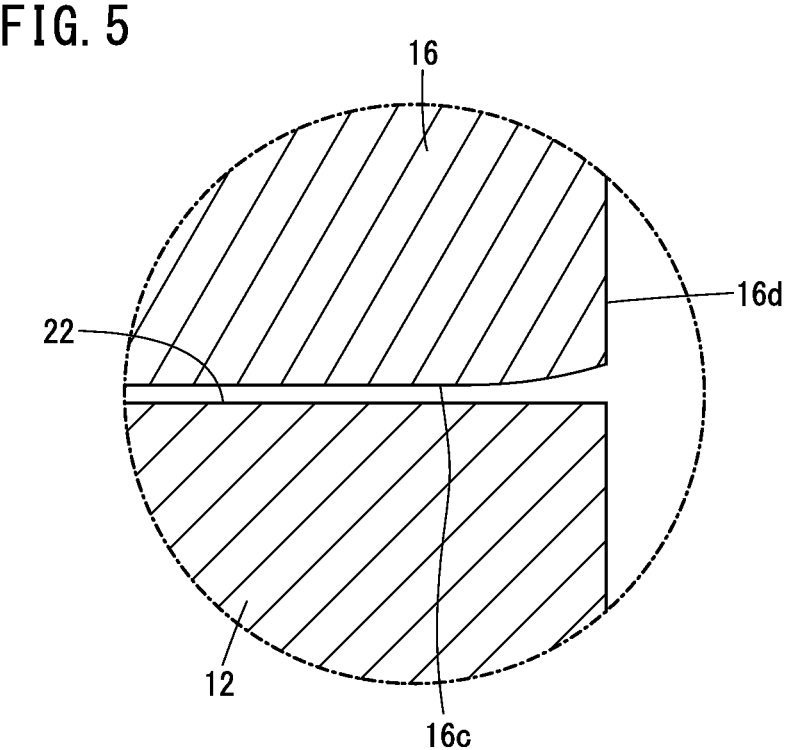
FIG. 5 is a diagram showing a portion of a cross section of a finger and a body taken along line V-V of FIG. 3.
Figure 6A:
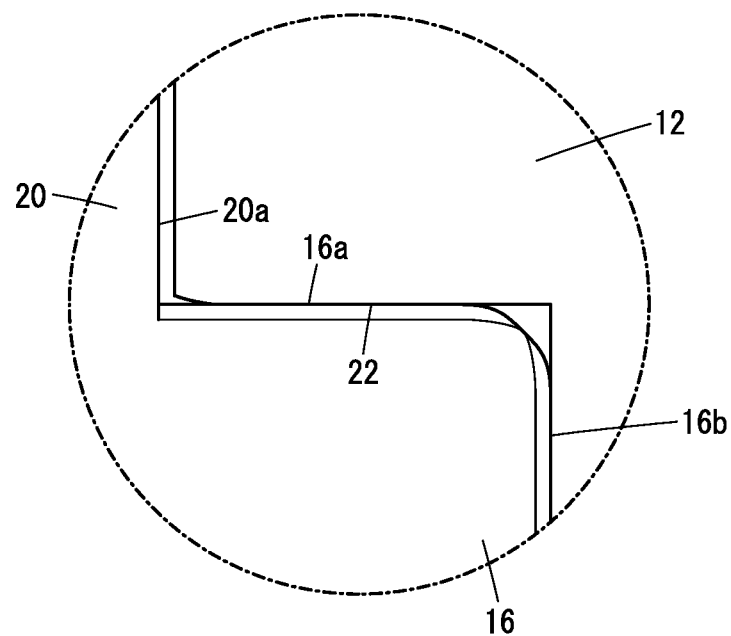
FIG. 6A is an enlarged view of a portion A shown in FIG. 3.
Figure 6B:
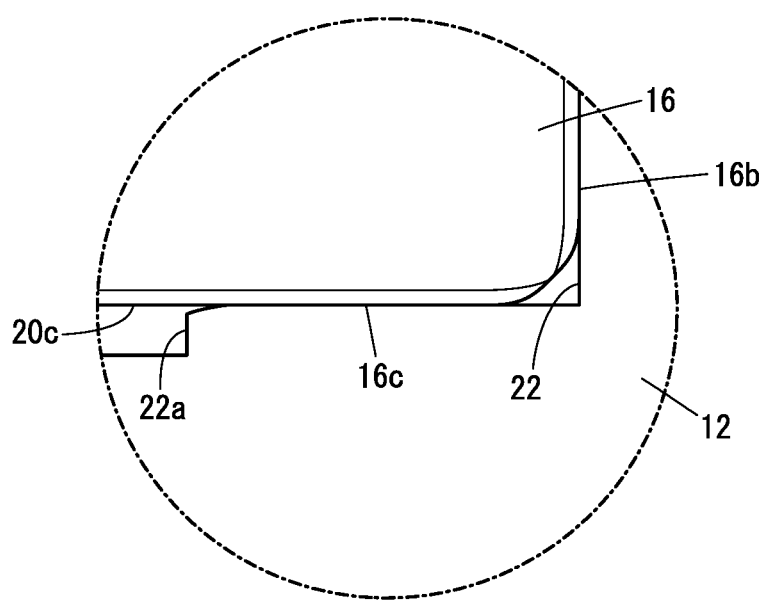
FIG. 6B is an enlarged view of a portion B shown in FIG. 3.

In these crownings, gaps are formed between the overhanging portions 16 and 18 of the fingers 14 and the wall surfaces of the guide groove 22, in a manner so as to continuously and gently expand from portions where both members are in contact. In this instance, the meaning of "gaps are formed in a manner so as to continuously and gently expand from portions where both members are in contact" is supplemented as follows (the same applies to other locations of the same description given in the present specification). When the fingers are placed in contact with the body under a strong pressure, one or both of the fingers and the body are elastically deformed, and the boundary between the regions where both members are in contact and the regions where they are not in contact is moved. Crowning is applied to a region including from a starting point of the boundary to a conceivable end point, and is formed so as to draw a gentle curve across the entire region. More specifically, it is necessary to prevent locations from being generated where angles (corners) are formed in the regions where the fingers are placed in contact with the body. Crowning, which is applied to the intersection between the first end surface 16d and the lower surface 16c of the overhanging portion 16, is shown in FIG. 5. Crowning, which is applied to the intersection between the side surface 16b and the upper surface 16a of the overhanging portion 16, is shown in FIG. 6A. Crowning, which is applied to the intersection between the side surface 16b and the lower surface 16c of the overhanging portion 16, is shown in FIG. 6B.

Further, in the guide groove 22 of the body 12, crowning is applied to the intersections between the wall surfaces facing toward the upper surfaces 16a and 18a of the overhanging portions 16 and 18 and the wall surfaces facing toward the side surfaces 20a and 20b of the main body portion 20. Furthermore, crowning is also applied to locations where the stepped portions 22a face toward the lower surfaces 16c and 18c of the overhanging portions 16 and 18.

In these crownings as well, gaps are formed between the overhanging portions 16 and 18 of the fingers 14 and the wall surfaces of the guide groove 22, in a manner so as to continuously and gently expand from portions where both members are in contact. Crowning, which is applied to the intersection between the wall surface of the guide groove 22 facing toward the upper surface 16a of the overhanging portion 16 and the wall surface of the guide groove 22 facing toward the side surface 20a of the main body portion 20, is shown in FIG. 6A. Crowning, which is applied to a location where the stepped portion 22a faces toward the lower surface 16c of the overhanging portion 16, is shown in FIG. 6B.

When the workpiece is gripped using the opening/closing chuck 10, a pitch moment (a moment about the Y axis) acts on the fingers 14. Further, there may be cases in which loads in the vertical direction (in the Z direction), loads in the lateral direction (in the Y direction), a roll moment (a moment about the X axis), and a yaw moment (a moment about the Z axis) act on the fingers 14.

The crowning applied to the intersections between the upper surfaces 16a and 18a and the first end surfaces 16d and 18d, and to the intersections between the lower surfaces 16c and 18c and the first end surfaces 16d and 18d alleviates concentration of stress primarily when a pitch moment acts on the fingers 14. The crowning applied to the intersections between the upper surfaces 16a and 18a and the second end surfaces 16e and 18e, and to the intersections between the lower surfaces 16c and 18c and the second end surfaces 16e and 18e alleviates concentration of stress primarily when a pitch moment acts on the fingers 14. Assuming that the radius of curvature of these crownings is indicated by R1, and the length of the overhanging portions 16 and 18 in the longitudinal direction (the X direction) is indicated by L, the value of R1/L preferably lies within a range of 0.1 to 27.

The crowning applied to the intersections between the upper surfaces 16a and 18a and the side surfaces 16b and 18b, and to the intersections between the lower surfaces 16c and 18c and the side surfaces 16b and 18b alleviates concentration of stress primarily when a roll moment acts on the fingers 14. Assuming that the radius of curvature of these crownings is indicated by R2, and the length of the overhanging portions 16 and 18 in the widthwise direction (the Y direction) is indicated by W, the value of R2/W preferably lies within a range of 0.1 to 27. The crowning applied to the guide groove 22 of the body 12 also alleviates concentration of stress when a roll moment acts on the fingers 14.

The crowning applied to the intersections between the side surfaces 16b and 18b and the first end surfaces 16d and 18d, and to the intersections between the side surfaces 16b and 18b and the second end surfaces 16e and 18e alleviates concentration of stress primarily when a yaw moment acts on the fingers 14. Assuming that the radius of curvature of these crownings is indicated by R3, and the length of the overhanging portions 16 and 18 in the longitudinal direction is indicated by L, the value of R3/L preferably lies within a range of 0.1 to 27.

The crowning applied to the intersections between the lower surfaces 16c and 18c and the first end surfaces 16d and 18d alleviates concentration of stress when loads in the vertical direction act on the fingers 14. The crowning applied to the intersections between the lower surfaces 16c and 18c and the second end surfaces 16e and 18e, and to the intersections between the lower surfaces 16c and 18c and the side surfaces 16b and 18b also alleviates concentration of stress when loads in the vertical direction act on the fingers 14. Among the crowning applied to the guide groove 22 of the body 12, the crowning applied to portions where the stepped portions 22a face toward the lower surfaces 16c and 18c of the overhanging portions 16 and 18 also alleviates concentration of stress when loads in the vertical direction act on the fingers 14.

The crowning applied to the intersections between the side surfaces 16b and 18b and the first end surfaces 16d and 18d alleviates concentration of stress when loads in the lateral direction act on the fingers 14. The crowning applied to the intersections between the side surfaces 16b and 18b and the second end surfaces 16e and 18e, to the intersections between the upper surfaces 16a and 18a and the side surfaces 16b and 18b, and to the intersections between the lower surfaces 16c and 18c and the side surfaces 16b and 18b also alleviates concentration of stress when loads in the lateral direction act on the fingers 14.

In accordance with the opening/closing chuck 10 according to the present embodiment, crowning is applied to the intersections between the five surfaces including the upper surfaces 16a and 18a, the side surfaces 16b and 18b, the lower surfaces 16c and 18c, the first end surfaces 16d and 18d, and the second end surfaces 16e and 18e that make up the outer peripheral surfaces of the overhanging portions 16 and 18 of the fingers 14. Further, crowning is applied to a predetermined location of the guide groove 22 of the body 12. Therefore, it is possible to alleviate concentration of stress when moments about the three axes or loads in a vertical direction act on the fingers 14.

Next, a description will be given with reference to FIGS. 7 to 9 concerning a method of manufacturing the fingers 14 of the opening/closing chuck 10, and more specifically, concerning a method (a crowning process) of applying crowning to the fingers 14.

This crowning process involves application of all of the aforementioned crownings, by a combination of performing grinding with respect to the side surfaces 16b and 18b of the pair of overhanging portions 16 and 18, and performing grinding with respect to the upper surfaces 16a and 18a and the lower surfaces 16c and 18c of the pair of overhanging portions 16 and 18. Grinding with respect to the side surfaces 16b and 18b of the pair of overhanging portions 16 and 18 is performed using a first machining tool 34 made up from a grindstone or an end mill. Grinding with respect to the upper surfaces 16a and 18a and the lower surfaces 16c and 18c of the pair of overhanging portions 16 and 18 is performed using a second machining tool 36 made up from a grindstone or an end mill.

As shown in FIG. 7, the first machining tool 34, which is a rotating body, is made so that the shape of a surface thereof, which is in contact with the workpiece to be machined, matches the shapes of the side surfaces 16b and 18b of the target overhanging portions 16 and 18. The first machining tool 34 includes crowning machining portions 34a on both ends thereof. The first machining tool 34 is arranged so that an axis thereof is arranged so as to be oriented along the Z direction, and can be rotationally driven about such an axis. Further, the first machining tool 34 is capable of being freely moved in the X direction and the Y direction. It should be noted that, in FIG. 7, one of the fingers 14 having a shape after the crowning process has been performed thereon is shown for the sake of convenience.

In the same manner, the second machining tool 36, which is a rotating body, is made so that the shape of a surface thereof, which is in contact with the workpiece to be machined, matches the shapes of the upper surfaces 16a and 18a and the lower surfaces 16c and 18c of the target overhanging portions 16 and 18. The second machining tool 36 includes a crowning machining portion 36a on one end thereof. The second machining tool 36 is arranged so that an axis thereof is arranged so as to be oriented along the Y direction, and can be rotationally driven about such an axis. Further, the second machining tool 36 is capable of being freely moved in the X direction and the Z direction.

When the crowning process is performed, first, the fingers 14 are fixed to a clamp base 38 in a posture with the pair of overhanging portions 16 and 18 facing upward. At this time, the first machining tool 34 is placed in a retracted position separated away from the side surface 16b by a predetermined distance midway along the longitudinal direction (the X direction) of the side surface 16b of one of the overhanging portions 16. Further, the second machining tool 36 is placed in a retracted position separated away from the lower surface 18c by a predetermined distance midway along the longitudinal direction (the X direction) of the lower surface 18c of another of the overhanging portions 18.

Next, while being rotated about the axis thereof, the first machining tool 34 is made to move in the Y2 direction and approach toward the side surface 16b of the one of the overhanging portions 16, and is brought into contact at a predetermined pressure with the side surface 16b. In accordance therewith, the side surface 16b of the one of the overhanging portions 16 at a site where the first machining tool 34 is placed in contact therewith is subjected to grinding. In order to perform such grinding over the entire side surface 16b of the one of the overhanging portions 16 and the entire side surface 18b of the other of the overhanging portions 18, the first machining tool 34 is made to move in a circling manner around the outer sides thereof.

Figure 8:
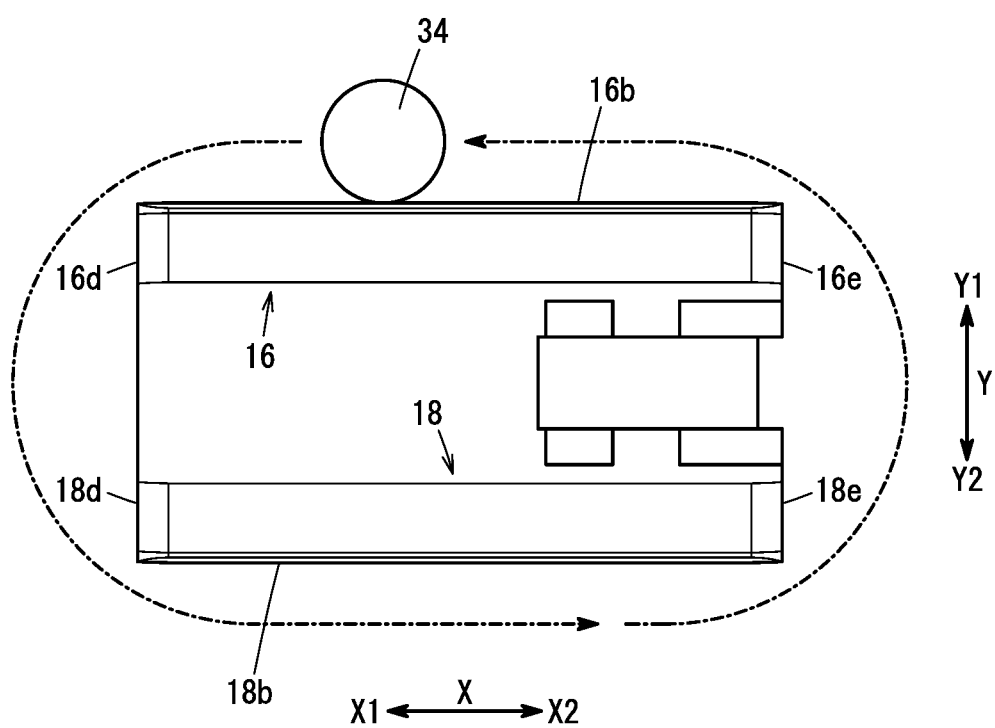
FIG. 8 is a diagram schematically showing a path over which a first machining tool is made to move when crowning is applied to the finger shown in FIG. 4.

More specifically, as schematically shown in FIG. 8, the first machining tool 34 is made to move in the X1 direction along the side surface 16b of the one of the overhanging portions 16 until arriving in the vicinity of the first end surface 16d. Thereafter, the first machining tool 34 is made to move in the Y2 direction until arriving in the vicinity of the side surface 18b of the other of the overhanging portions 18 while remaining at a distance from the finger 14, and furthermore, is made to move in the X2 direction until arriving in the vicinity of the second end surface 18e along the side surface 18b of the other of the overhanging portions 18. Next, the first machining tool 34 is made to move in the Y1 direction until arriving in the vicinity of the side surface 16b of the one of the overhanging portions 16 while remaining at a distance from the finger 14, and thereafter, is made to move in the X1 direction along the side surface 16b of the one of the overhanging portions 16 until being returned to its original position.

When the first machining tool 34 is moved, in order for crowning to be applied to the intersection between the side surface 16b and the first end surface 16d of the one of the overhanging portions 16, at the intersection, grinding is performed while controlling the amount of traveling in the X1 direction and the amount of traveling in the Y2 direction of the first machining tool 34 toward a target shape. Further, in order for crowning to be applied to the intersection between the side surface 18b and the first end surface 18d of the other of the overhanging portions 18, at the intersection, grinding is performed while controlling the amount of traveling in the X2 direction and the amount of traveling in the Y2 direction of the first machining tool 34 toward a target shape. Similarly, in order for crowning to be applied to the intersection between the side surface 18b and the second end surface 18e of the other of the overhanging portions 18, at the intersection, grinding is performed while controlling the amount of traveling in the X2 direction and the amount of traveling in the Y1 direction of the first machining tool 34 toward a target shape. Further, in order for crowning to be applied to the intersection between the side surface 16b and the second end surface 16e of the one of the overhanging portions 16, at the intersection, grinding is performed while controlling the amount of traveling in the X1 direction and the amount of traveling in the Y1 direction of the first machining tool 34 toward a target shape.

By causing the first machining tool 34 to circle one time therearound, grinding with respect to the side surfaces 16b and 18b of the pair of overhanging portions 16 and 18 is completed. Rotation of the first machining tool 34 is made to stop, and the first machining tool 34 is separated and retracted away from the side surface 16b of the one of the overhanging portions 16.

Next, while being rotated about the axis thereof, the second machining tool 36 is made to move in the Z1 direction and approach toward the lower surface 18c of the other of the overhanging portions 18, and is brought into contact at a predetermined pressure with the lower surface 18c. In accordance therewith, the lower surface 18c of the other of the overhanging portions 18 at a site where the second machining tool 36 is placed in contact therewith is subjected to grinding. In order to perform such grinding over the entire lower surface 18c and the entire upper surface 18a of the other of the overhanging portions 18, the second machining tool 36 is made to move in a circling manner around the outer sides thereof.

Figure 9:
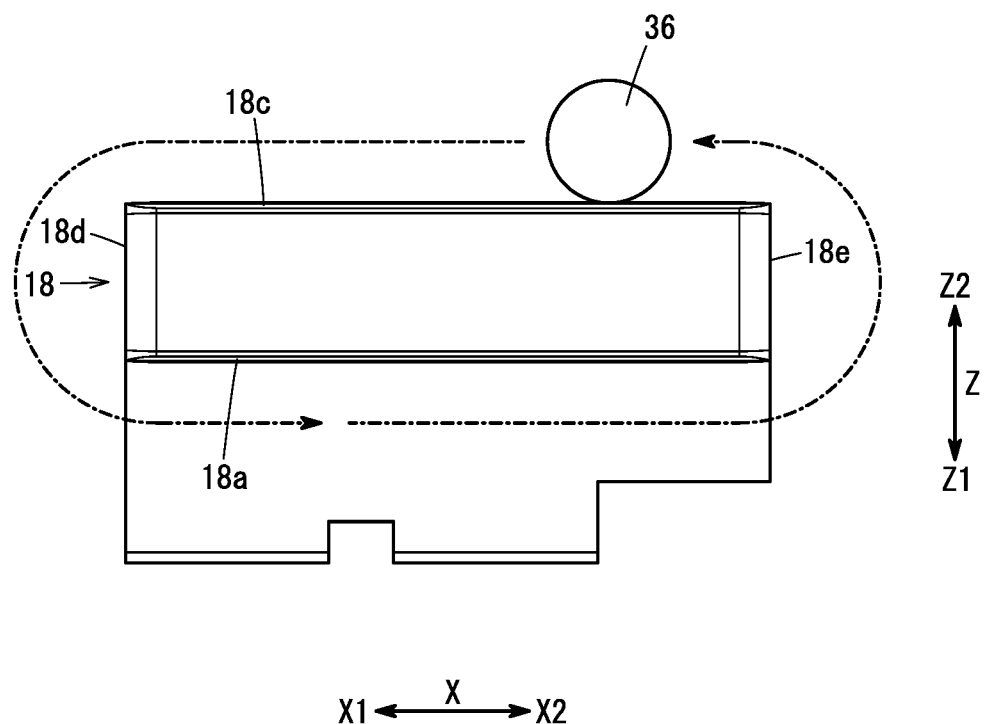
FIG. 9 is a diagram schematically showing a path over which a second machining tool is made to move when crowning is applied to the finger shown in FIG. 4.

More specifically, as schematically shown in FIG. 9, the second machining tool 36 is made to move in the X1 direction along the lower surface 18c of the other of the overhanging portions 18 until arriving in the vicinity of the first end surface 18d. Thereafter, the second machining tool 36 is made to move in the Z1 direction until arriving in the vicinity of the upper surface 18a while remaining at a distance from the finger 14. Furthermore, the second machining tool 36 is made to move in the X2 direction along the upper surface 18a until arriving in the vicinity of the second end surface 18e. Next, the second machining tool 36 is made to move in the Z2 direction until arriving in the vicinity of the lower surface 18c while remaining at a distance from the finger 14. Thereafter, the second machining tool 36 is made to move in the X1 direction along the lower surface 18c until being returned to its original position.

When the above-described second machining tool 36 is moved, in order for crowning to be applied to the intersection between the lower surface 18c and the first end surface 18d, at the intersection, grinding is performed while controlling the amount of traveling in the X1 direction and the amount of traveling in the Z1 direction of the second machining tool 36 toward a target shape. Further, in order for crowning to be applied to the intersection between the upper surface 18a and the first end surface 18d, at the intersection, grinding is performed while controlling the amount of traveling in the X2 direction and the amount of traveling in the Z1 direction of the second machining tool 36 toward a target shape. Further, in order for crowning to be applied to the intersection between the upper surface 18a and the second end surface 18e, at the intersection, grinding is performed while controlling the amount of traveling in the X2 direction and the amount of traveling in the Z2 direction of the second machining tool 36 toward a target shape. Further, in order for crowning to be applied to the intersection between the lower surface 18c and the second end surface 18e, at the intersection, grinding is performed while controlling the amount of traveling in the X1 direction and the amount of traveling in the Z2 direction of the second machining tool 36 toward a target shape.

By causing the second machining tool 36 to circle one time around the other of the overhanging portions 18, grinding with respect to the upper surface 18a and the lower surface 18c of the other of the overhanging portions 18 is completed. Rotation of the second machining tool 36 is made to stop, and the second machining tool 36 is separated and retracted away from the lower surface 18c of the other of the overhanging portions 18.

Next, the clamp base 38 is rotated 180 degrees in the horizontal plane so that the second machining tool 36 is positioned in facing relation to the lower surface 16c of the one of the overhanging portions 16. Thereafter, while being rotated again about the axis thereof, the second machining tool 36 is made to move in the Z1 direction and approach toward the lower surface 16c of the one of the overhanging portions 16, and is brought into contact at a predetermined pressure with the lower surface 16c. In accordance therewith, the lower surface 16c of the one of the overhanging portions 16 at a site where the second machining tool 36 is placed in contact therewith is subjected to grinding. In order to perform such grinding over the entire upper surface 16a and the entire lower surface 16c of the one of the overhanging portions 16, the second machining tool 36 is made to move in a circling manner around the outer sides thereof.

More specifically, the second machining tool 36 is made to move in the X2 direction along the lower surface 16c of the one of the overhanging portions 16 until arriving in the vicinity of the second end surface 16e. Thereafter, the second machining tool 36 is made to move in the Z1 direction until arriving in the vicinity of the upper surface 16a while remaining at a distance from the finger 14. Furthermore, the second machining tool 36 is made to move in the X1 direction along the upper surface 16a until arriving in the vicinity of the first end surface 16d. Next, the second machining tool 36 is made to move in the Z2 direction until arriving in the vicinity of the lower surface 16c while remaining at a distance from the finger 14. Thereafter, the second machining tool 36 is made to move in the X2 direction along the lower surface 16c until being returned to its original position.

When the second machining tool 36 is moved, the amount of traveling in the X direction and the amount of traveling in the Z direction of the second machining tool 36 is controlled, in the same manner as in the case of the other of the overhanging portions 18, at the intersection between the lower surface 16c and the second end surface 16e, at the intersection between the upper surface 16a and the second end surface 16e, at the intersection between the upper surface 16a and the first end surface 16d, and at the intersection between the lower surface 16c and the first end surface 16d.

By causing the second machining tool 36 to circle one time around the one of the overhanging portions 16, grinding with respect to the upper surface 16a and the lower surface 16c of the one of the overhanging portions 16 is completed. Rotation of the second machining tool 36 is made to stop, and the second machining tool 36 is separated and retracted away from the lower surface 16c of the one of the overhanging portions 16. Due to the steps described above, crowning can be applied to the intersections of the five surfaces that make up the outer peripheral surfaces of the pair of overhanging portions 16 and 18 of the fingers 14.

Second Embodiment

Next, a description will be given with reference to FIGS. 10 to 13 concerning a method of manufacturing an opening/closing chuck 40 and fingers 42 thereof according to a second embodiment of the present invention. In the opening/closing chuck 40 according to the second embodiment, the shape of the pair of overhanging portions of the fingers and the shape of the guide groove of the body differ from those of the opening/closing chuck 10 according to the first embodiment.

Figure 10:
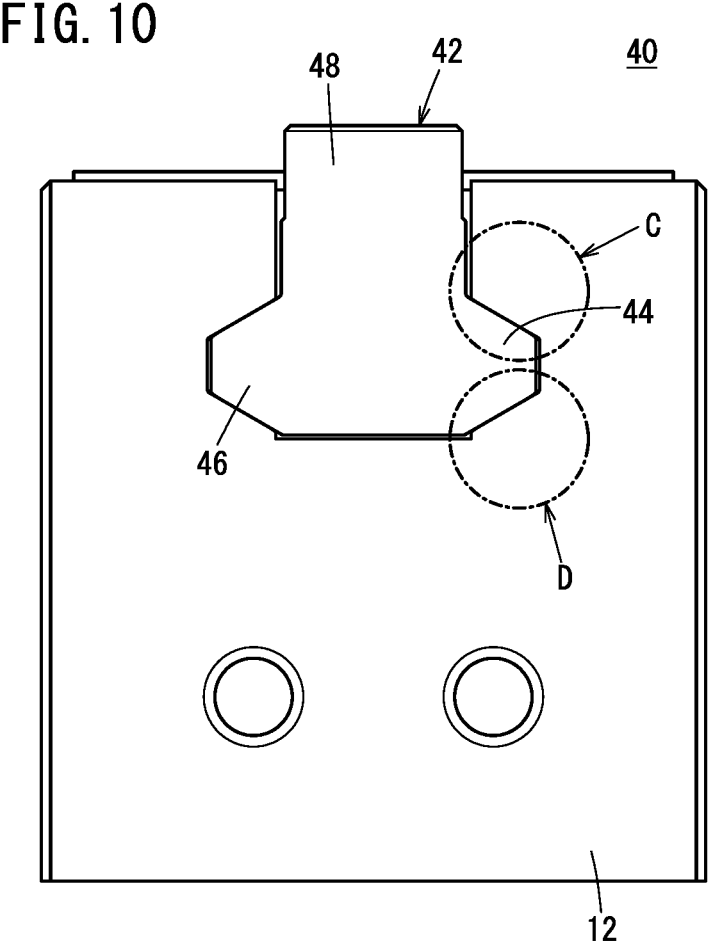
FIG. 10 is a front view of an opening/closing chuck according to a second embodiment of the present invention.
Figure 12:
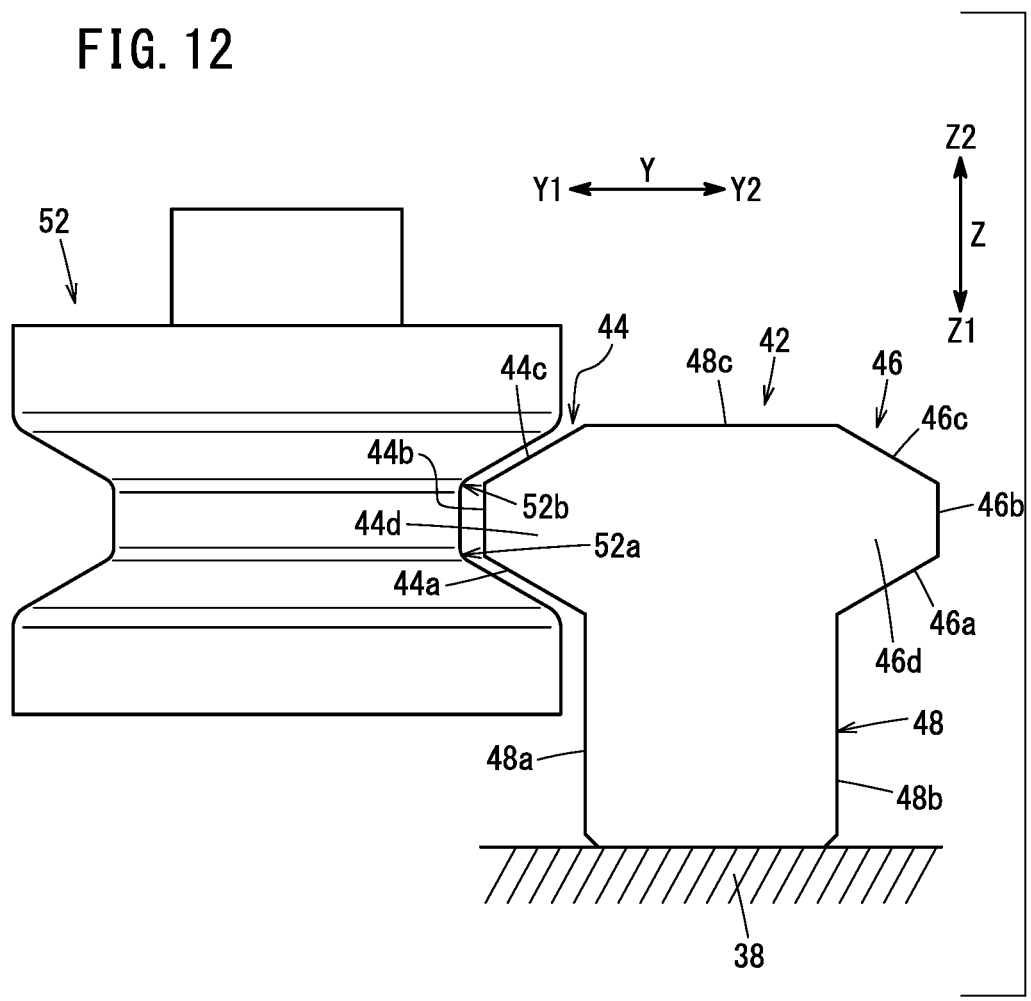
FIG. 12 is a diagram schematically showing a method of applying crowning to the finger shown in FIG. 10.

As shown in FIGS. 10 and 12, each of the fingers 42 includes a pair of trapezoidal overhanging portions 44 and 46 which project out laterally from a main body portion 48 over the entire length thereof in the longitudinal direction. Upper surfaces 44a and 46a and lower surfaces 44c and 46c of each of the overhanging portions 44 and 46 are formed as tapered surfaces, which are inclined so as to come into closer proximity to each other toward side surfaces 44b and 46b. A guide groove 50 of the body 12 includes a cross-sectional shape that conforms to the cross-sectional shape of the fingers 42. In order to enable the sliding movement of the fingers 42, the upper surfaces 44a and 46a, the side surfaces 44b and 46b, and the lower surfaces 44c and 46c of the respective overhanging portions 44 and 46 face toward the wall surface of the guide groove 50 with a minute gap therebetween. Further, the bottom surface 48c of the main body portion 48 also faces toward the wall surface of the guide groove 50 with a minute gap therebetween.

Crowning is applied to the intersections between the five surfaces including the upper surfaces 44a and 46a, the side surfaces 44b and 46b, the lower surfaces 44c and 46c, the first end surfaces 44d and 46d, and the second end surfaces 44e and 46e that make up the outer peripheral surfaces of the respective overhanging portions 44 and 46. More specifically, crowning is applied to the intersections between the upper surfaces 44a and 46a and the first end surfaces 44d and 46d, to the intersections between the side surfaces 44b and 46b and the first end surfaces 44d and 46d, and to the intersections between the lower surfaces 44c and 46c and the first end surfaces 44d and 46d. Similarly, crowning is applied to the intersections between the upper surfaces 44a and 46a and the second end surfaces 44e and 46e, to the intersections between the side surfaces 44b and 46b and the second end surfaces 44e and 46e, and to the intersections between the lower surfaces 44c and 46c and the second end surfaces 44e and 46e. Further, crowning is also applied to the intersections between the upper surfaces 44a and 46a and the side surfaces 44b and 46b, and to the intersections between the lower surfaces 44c and 46c and the side surfaces 44b and 46b.

Figure 11A:
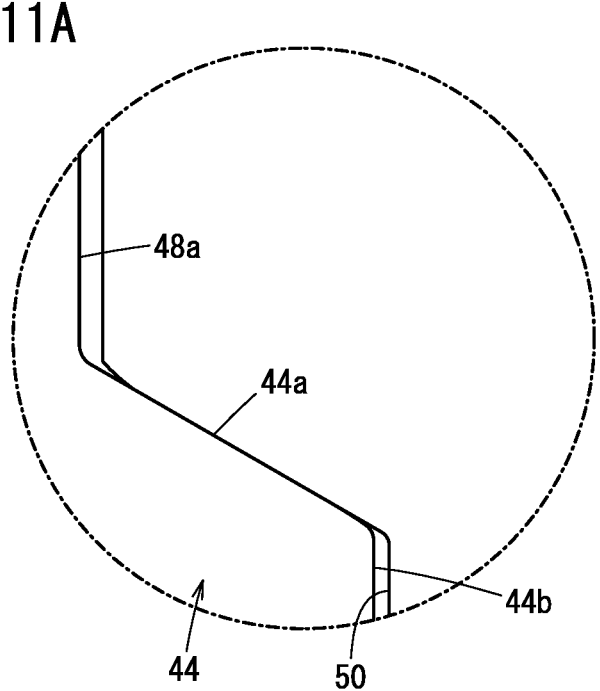
FIG. 11A is an enlarged view of a portion C shown in FIG. 10.
Figure 11B:
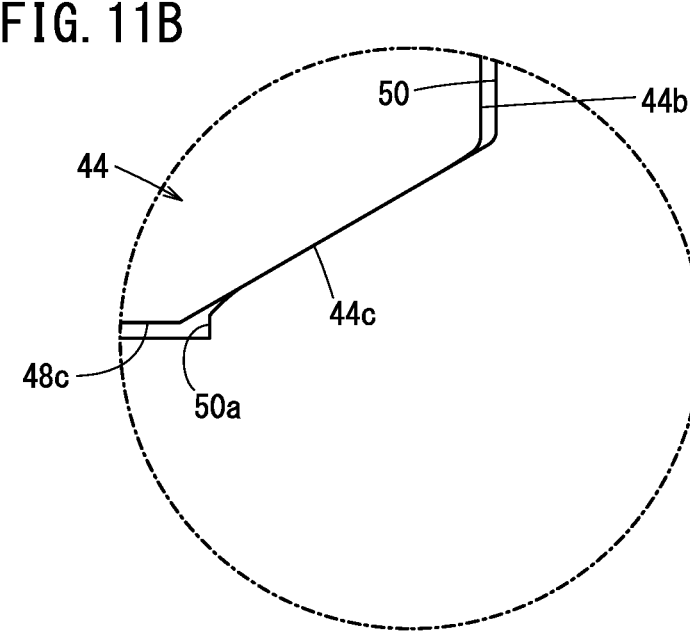
FIG. 11B is an enlarged view of a portion D shown in FIG. 10.

In these crownings, gaps are formed between the overhanging portions 44 and 46 of the fingers 42 and the wall surfaces of the guide groove 50, in a manner so as to continuously and gently expand from portions where both members are in contact. Crowning that is applied to the intersection between the side surface 44b and the upper surface 44a of the overhanging portion 44 is shown in FIG. 11A. Crowning that is applied to the intersection between the side surface 44b and the lower surface 44c of the overhanging portion 44 is shown in FIG. 11B.

Further, in the guide groove 50 of the body 12, crowning is applied to the intersections between the wall surfaces facing toward the upper surfaces 44a and 46a of the overhanging portions 44 and 46 and the wall surfaces facing toward the side surfaces 48a and 48b of the main body portion 48. Furthermore, crowning is also applied to locations where stepped portions 50a face toward the lower surfaces 44c and 46c of the overhanging portions 44 and 46.

In these crownings, gaps are formed between the overhanging portions 44 and 46 of the fingers 42 and the wall surfaces of the guide groove 50, in a manner so as to continuously and gently expand from portions where both members are in contact. Crowning that is applied to the intersection between the wall surface of the guide groove 50 facing toward the upper surface 44a of the overhanging portion 44 and the wall surface of the guide groove 50 facing toward the side surface 48a of the main body portion 48 is shown in FIG. 11A. Crowning that is applied to a location where the stepped portion 50a faces toward the lower surface 44c of the overhanging portion 44 is shown in FIG. 11B.

In accordance with the opening/closing chuck 40 according to the present embodiment, crowning is applied to the intersections between the five surfaces including the upper surfaces 44a and 46a, the side surfaces 44b and 46b, the lower surfaces 44c and 46c, the first end surfaces 44d and 46d, and the second end surfaces 44e and 46e that make up the outer peripheral surfaces of the overhanging portions 44 and 46 of the fingers 42. Further, crowning is applied to a predetermined location of the guide groove 50 of the body 12. Therefore, it is possible to alleviate concentration of stress when moments about the three axes or loads in a vertical direction act on the fingers.

Next, a description will be given with reference to FIGS. 12 and 13 concerning a method (a crowning process) of applying crowning to the fingers 42. In this crowning process, using a third machining tool 52 (a single machining tool) made up from a grindstone or an end mill, grinding is performed with respect to the side surfaces 44b and 46b of the pair of overhanging portions 44 and 46, grinding is simultaneously performed with respect to the upper surfaces 44a and 46a and the lower surfaces 44c and 46c of the pair of overhanging portions 44 and 46, and all of the aforementioned crowning is applied.

As shown in FIG. 12, the third machining tool 52, which is a rotating body, is made so that the shape of a surface thereof, which is in contact with the workpiece to be machined, matches the shapes of the upper surfaces 44a and 46a, the side surfaces 44b and 46b, and the lower surfaces 44c and 46c of the target overhanging portions 44 and 46. The third machining tool 52 is arranged so that an axis thereof is arranged so as to be oriented along the Z direction, and can be rotationally driven about such an axis. Further, the third machining tool 52 is capable of being freely moved in the X direction and the Y direction.

The third machining tool 52 has a first crowning machining portion 52a and a second crowning machining portion 52b. The first crowning machining portion 52a is a machining portion in order to apply crowning to intersections between the upper surfaces 44a and 46a and the side surfaces 44b and 46b of the overhanging portions 44 and 46.

The second crowning machining portion 52b is a machining portion in order to apply crowning to intersections between the lower surfaces 44c and 46c and the side surfaces 44b and 46b of the overhanging portions 44 and 46.

When the crowning process is performed, first, the fingers 42 are fixed to the clamp base 38 in a posture in which the pair of overhanging portions 44 and 46 face upward. At this time, it is assumed that the third machining tool 52 is at a position in confronting relation to the overhanging portion 44 midway along the longitudinal direction (the X direction) of one of the overhanging portions 44.

Next, while being rotated about the axis thereof, the third machining tool 52 is made to move in the Y2 direction and approach toward the one of the overhanging portions 44, and is brought into contact at a predetermined pressure with the upper surface 44a, the side surface 44b, and the lower surface 44c. In accordance therewith, the upper surface 44a, the side surface 44b, and the lower surface 44c of the one of the overhanging portions 44 at a site where the third machining tool 52 is placed in contact therewith are simultaneously subjected to grinding. In order to perform such grinding over the entirety of the one of the overhanging portions 44 and the entirety of the other of the overhanging portions 46, the third machining tool 52 is made to move in a circling manner around the outer sides thereof.

Figure 13:
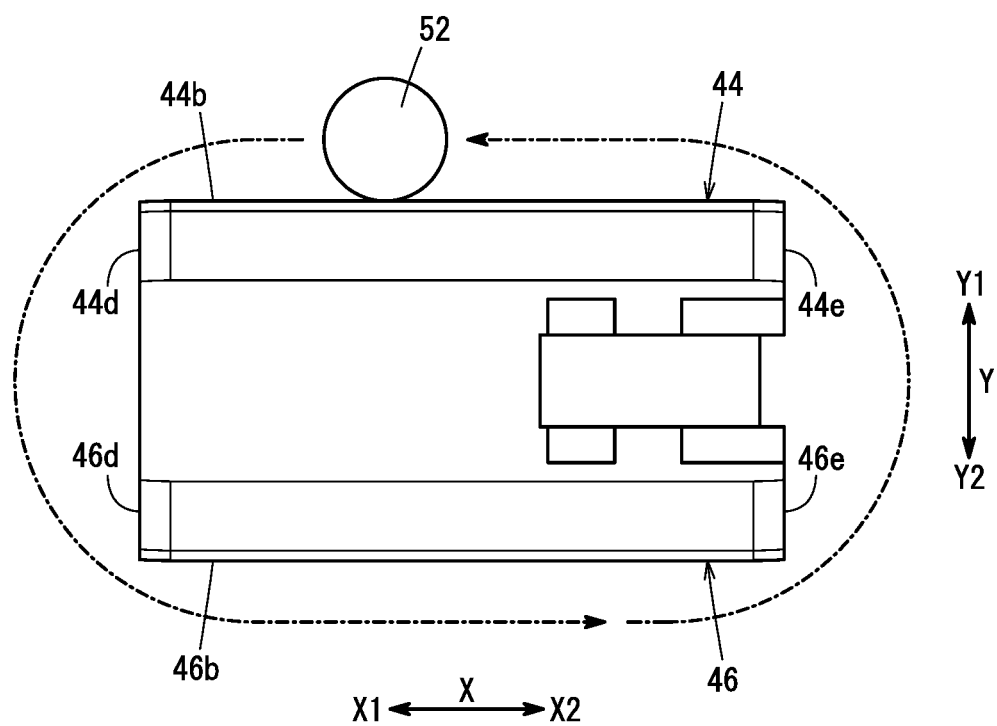
FIG. 13 is a diagram schematically showing a path over which a third machining tool is made to move when crowning is applied to the finger of the opening/closing chuck shown in FIG. 10.

More specifically, as schematically shown in FIG. 13, the third machining tool 52 is made to move in the X1 direction along the side surface 44b etc. of the one of the overhanging portions 44 until arriving in the vicinity of the first end surface 44d. Thereafter, the third machining tool 52 is moved in the Y2 direction until arriving in the vicinity of the side surface 46b of the other of the overhanging portions 46 while remaining at a distance from the finger 42. Furthermore, the third machining tool 52 is made to move in the X2 direction along the side surface 46b of the other of the overhanging portions 46 until arriving in the vicinity of the second end surface 46e. Next, the third machining tool 52 is moved in the Y1 direction until arriving in the vicinity of the side surface 44b of the one of the overhanging portions 44 while remaining at a distance from the finger 42. Thereafter, the third machining tool 52 is moved in the X1 direction along the side surface 44b or the like of the one of the overhanging portions 44 until being returned to its original position.

When the above-described third machining tool 52 is moved, regarding the one of the overhanging portions 44, crowning is applied to the intersection between the upper surface 44a and the first end surface 44d, to the intersection between the side surface 44b and the first end surface 44d, and to the intersection between the lower surface 44c and the first end surface 44d. More specifically, at these intersections, grinding is performed while controlling the amount of traveling in the X1 direction and the amount of traveling in the Y2 direction of the third machining tool 52 toward a target shape. Further, regarding the other of the overhanging portions 46, crowning is applied to the intersection between the upper surface 46a and the first end surface 46d, to the intersection between the side surface 46b and the first end surface 46d, and to the intersection between the lower surface 46c and the first end surface 46d. More specifically, at these intersections, grinding is performed while controlling the amount of traveling in the X2 direction and the amount of traveling in the Y2 direction of the third machining tool 52 toward a target shape.

Regarding the other of the overhanging portions 46, crowning is applied to the intersection between the upper surface 46a and the second end surface 46e, to the intersection between the side surface 46b and the second end surface 46e, and to the intersection between the lower surface 46c and the second end surface 46e. More specifically, at these intersections, grinding is performed while controlling the amount of traveling in the X2 direction and the amount of traveling in the Y1 direction of the third machining tool 52 toward a target shape. Regarding the one of the overhanging portions 44, crowning is applied to the intersection between the upper surface 44a and the second end surface 44e, to the intersection between the side surface 44b and the second end surface 44e, and to the intersection between the lower surface 44c and the second end surface 44e. More specifically, at these intersections, grinding is performed while controlling the amount of traveling in the X1 direction and the amount of traveling in the Y1 direction of the third machining tool 52 toward a target shape.

In this manner, merely by causing the third machining tool 52 to circle one time therearound, crowning can be applied to the intersections of the five surfaces that make up the outer peripheral surfaces of the pair of overhanging portions 44 and 46 of the fingers 42.

Third Embodiment

Next, a description will be given with reference to FIGS. 14 and 15 concerning fingers 62 of an opening/closing chuck and a method of manufacturing the same according to a third embodiment of the present invention. The fingers 62 according to the third embodiment differ from the fingers 42 of the opening/closing chuck according to the second embodiment, in that each of the overhanging portions includes a recess and a grease reservoir.

Figure 14:
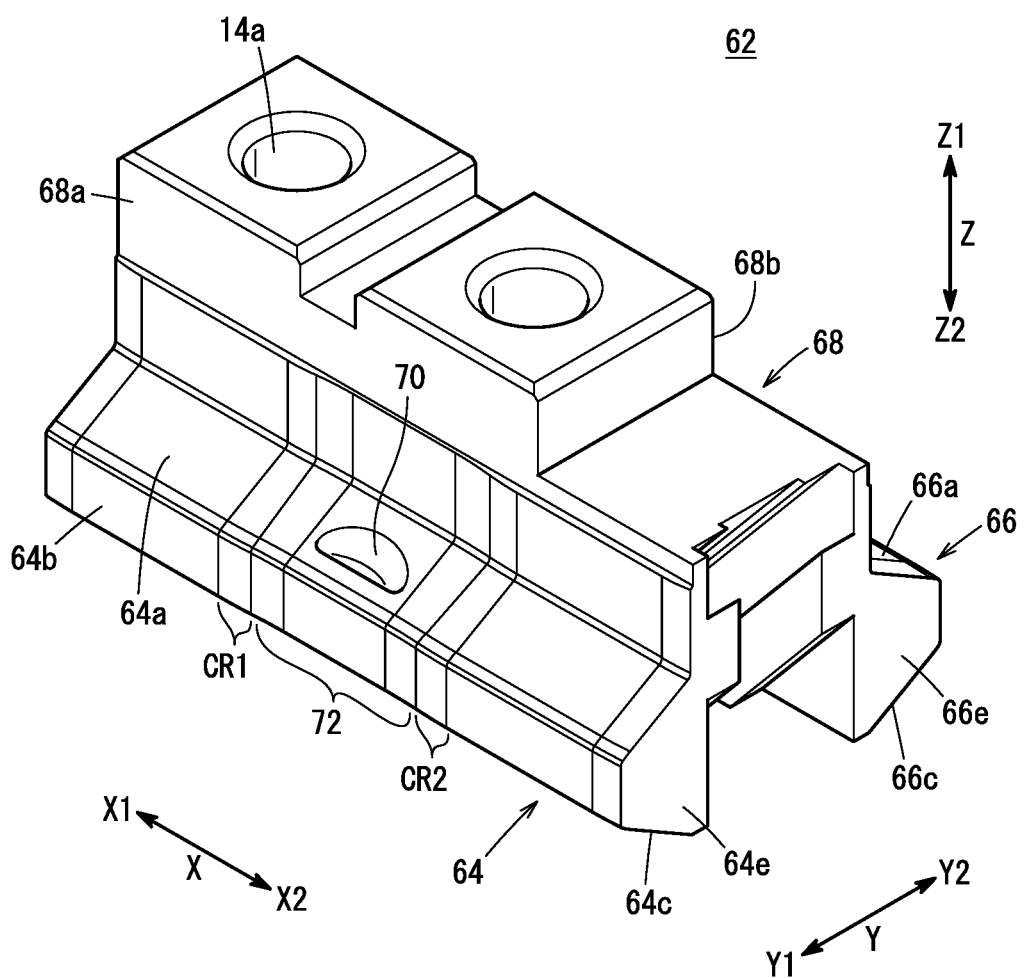
FIG. 14 is a perspective view of a finger of an opening/closing chuck according to a third embodiment of the present invention.
Figure 15:
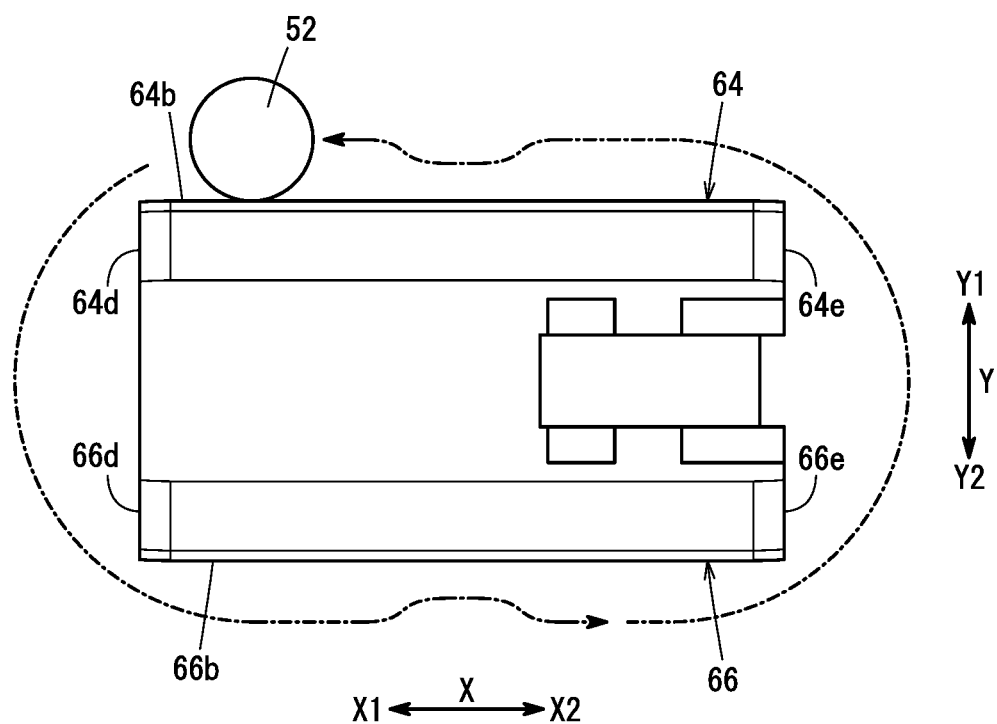
FIG. 15 is a diagram schematically showing a path over which a third machining tool is made to move when crowning is applied to the finger shown in FIG. 14.

As shown in FIG. 14, one of the overhanging portions 64 includes a recess 72 centrally in the longitudinal direction of the upper surface 64a, the side surface 64b, and the lower surface 64c, and includes crowning regions CR1 and CR2 at both ends of the recess 72. A grease reservoir 70 opens in a bottom surface of the recess 72 that is formed in the upper surface 64a. The other one of the overhanging portions 66 also includes a similar grease reservoir 70 therein. Grease that is stored in the grease reservoirs 70 is supplied to the sliding surfaces of the overhanging portions 64 and 66, and the lubricating function thereof is maintained.

Because the grease reservoir 70 opens on the bottom surface of the recess 72, an edge portion of the grease reservoir 70 does not come into contact with the wall surface of the guide groove and cause concentration of stress to occur. Further, the recess 72 is connected, via the crowning regions CR1 and CR2 to which crowning was applied, to sliding surfaces (surfaces in contact with the wall surfaces of the guide groove) on the upper surface 64a, the side surface 64b, and the lower surface 64c. Therefore, due to the presence of the recess 72, concentration of stress within the guide groove does not occur.

Crowning is applied to the intersections between the five surfaces including the upper surfaces 64a and 66a, the side surfaces 64b and 66b, the lower surfaces 64c and 66c, the first end surfaces 64d and 66d, and the second end surfaces 64e and 66e that make up the outer peripheral surfaces of the respective overhanging portions 64 and 66. Further, in the guide groove of the body 12, crowning is applied to the intersections between the wall surfaces facing toward the upper surfaces 64a and 66a of the overhanging portions 64 and 66 and the wall surfaces facing toward the side surfaces 68a and 68b of the main body portion 68. Further, crowning is also applied to locations where the stepped portions of the guide groove face toward the lower surfaces 64c and 66c of the overhanging portions 64 and 66.

Next, a description will be given with reference to FIG. 15 concerning a method (a crowning process) of applying crowning to the fingers 62. In this crowning process, using the third machining tool 52 (a single machining tool) also used in the second embodiment, grinding is performed with respect to the side surfaces 64b and 66b of the pair of overhanging portions 64 and 66, grinding is simultaneously performed with respect to the upper surfaces 64a and 66a and the lower surfaces 64c and 66c of the pair of overhanging portions 64 and 66, applying all of the aforementioned crowning.

While being rotated about the axis thereof, the third machining tool 52 is brought into contact with the upper surface 64a, the side surface 64b, and the lower surface 64c at predetermined positions in the longitudinal direction (the X direction) of the one of the overhanging portions 64, and these surfaces are simultaneously subjected to grinding. In order to perform such grinding over the entirety of the one of the overhanging portions 64 and the entirety of the other of the overhanging portions 66, the third machining tool 52 is made to move in a circling manner around the outer sides thereof.

When the third machining tool 52 is moved, at the intersection between the side surface 64b and the first end surface 64d of the one of the overhanging portions 64 and at the intersection between the side surface 66b and the first end surface 66d of the other of the overhanging portions 66, similar to the case of the second embodiment, grinding is performed while controlling the amount of traveling in the X direction and the amount of traveling in the Y direction of the third machining tool 52 toward a target shape. At the intersection between the side surface 66b and the second end surface 66e of the other of the overhanging portions 66, and at the intersection between the side surface 64b and the second end surface 64e of the one of the overhanging portions 64 as well, similar to the case of the second embodiment, grinding is performed while controlling the amount of traveling in the X direction and the amount of traveling in the Y direction of the third machining tool 52 toward a target shape.

Further, concerning the one of the overhanging portions 64, in order to form the crowning regions CR1 and CR2 and the recess 72 therein, in a central vicinity in the longitudinal direction of the one of the overhanging portions 64, grinding is performed while controlling the amount of traveling in the Y1 direction and the amount of traveling in the Y2 direction of the third machining tool 52 toward a target shape. Similarly, in a central vicinity in the longitudinal direction of the other of the overhanging portions 66, grinding is performed while controlling the amount of traveling in the Y1 direction and the amount of traveling in the Y2 direction of the third machining tool 52 toward a target shape.

In this manner, merely by causing the third machining tool 52 to circle one time therearound, crowning can be applied to the intersections of the five surfaces that make up the outer peripheral surfaces of the pair of overhanging portions 64 and 66, together with enabling the crowning regions CR1 and CR2 and the recesses 72 to be formed on the pair of overhanging portions 64 and 66.

The present invention is not limited to the embodiments described above, but various configurations can be adopted therein without deviating from the essence and gist of the present invention.

What is claimed is:

1. A method of manufacturing fingers configured to slide inside of a guide groove of a body of an opening/closing chuck, and which are slidably supported in directions to approach toward and separate away from each other;

wherein the fingers each include a pair of overhanging portions configured to project out laterally from a main body portion, outer peripheral surfaces of the overhanging portions are made up from five surfaces including upper surfaces, side surfaces, lower surfaces, first end surfaces, and second end surfaces, and the upper surfaces and the lower surfaces are tapered surfaces configured to come into closer proximity to each other toward the side surfaces;

the method of manufacturing the fingers comprising a step of applying crowning at intersections of the five surfaces, by performing grinding with respect to the side surfaces and simultaneously performing grinding with respect to the upper surfaces and the lower surfaces, using a single machining tool, wherein in the step of applying crowning, in a state where an axis of the machining tool is oriented along a Z direction, the machining tool is caused to circle in an X direction and a Y direction one time around each of the fingers while rotating about the axis.

2. The method of manufacturing the fingers according to claim 1, wherein:

the overhanging portions include recesses centrally in the longitudinal direction of the upper surfaces, the side surfaces, and the lower surfaces, together with crowning regions at both ends of the recesses, and grease reservoirs open on bottom surfaces of the recesses; and by the step, crowning of the crowning regions is applied.

* * * * *